United States Patent
Matsumoto

(10) Patent No.: US 6,646,709 B2
(45) Date of Patent: Nov. 11, 2003

(54) LIQUID CRYSTAL DISPLAY UNIT WITH SPACER LESS DAMAGED IN WASHING SOLUTION AND PROCESS FOR FABRICATION THEREOF

(75) Inventor: Kimikazu Matsumoto, Tokyo (JP)

(73) Assignee: NEC LCD Technologies, Ltd., Kanagawa (JP)

(*) Notice: Subject to any disclaimer, the term of this patent is extended or adjusted under 35 U.S.C. 154(b) by 76 days.

(21) Appl. No.: 09/906,096

(22) Filed: Jul. 17, 2001

(65) Prior Publication Data

US 2002/0063839 A1 May 30, 2002

(30) Foreign Application Priority Data

Jul. 19, 2000 (JP) .......................... 2000-219719

(51) Int. Cl.⁷ ............................................. G02F 1/1339
(52) U.S. Cl. ...................... 349/156; 349/155; 349/153; 349/190
(58) Field of Search ................ 349/156, 153, 349/155, 154, 190

(56) References Cited

U.S. PATENT DOCUMENTS 4,306,773 A    12/1981  Arnoldussen
5,691,793 A  * 11/1997  Watanabe et al. ............ 349/155
5,861,932 A  *  1/1999  Inata et al. .................. 349/156
6,144,435 A  * 11/2000  Yokoyama et al. .......... 349/133
6,396,559 B1 *  5/2002  Kishimoto et al. .......... 349/156

FOREIGN PATENT DOCUMENTS

JP           7-244287        9/1995

* cited by examiner

Primary Examiner—Robert H. Kim
Assistant Examiner—Jeanne DiGrazio
(74) Attorney, Agent, or Firm—Foley & Lardner

(57) ABSTRACT

An in-plane switching type liquid crystal display unit has an array substrate structure for a matrix of thin film transistors, pixel electrodes connectable through associated thin film transistors to data lines and a common electrode, a counter substrate structure for a black matrix and color filters and liquid crystal filling the gap between the array substrate structure and the counter substrate structure, wherein spacer columns and spacer walls are respectively formed in an image producing area and a frame area, and the spacer walls are formed of anti-eroded material less eroded in acidic washing solution rather than the sealant for a sealing layer for adhering the substrate structures together, thereby preventing the liquid crystal from contaminant due to the acidic washing solution.

20 Claims, 9 Drawing Sheets

LIQUID CRYSTAL DISPLAY UNIT WITH SPACER LESS DAMAGED IN WASHING SOLUTION AND PROCESS FOR FABRICATION THEREOF

FIELD OF THE INVENTION

This invention relates to a liquid crystal display unit and, more particularly, to a liquid crystal display unit with a spacer and a process for fabricating thereof.

DESCRIPTION OF THE RELATED ART

The liquid crystal display unit has a pair of transparent substrate structure spaced from each other, and liquid crystal is filled in the gap between the transparent substrate structures. An active matrix liquid crystal display unit is popular, and has the following structure. Pixel electrodes are arranged on one of the transparent substrate in matrix, and thin film transistors are connected between data lines and the pixel electrodes. The pixel electrodes are, by way of example, formed of indium tin oxide. A common electrode is provided in such a manner that electric field is created between each pixel electrode and the common electrode. A pair of polarizing plates is incorporated in the active matrix liquid crystal display unit. Black light passes one of the polarizing plates before entry into the liquid crystal, and images are produced through the other polarizing plate after passing the liquid crystal. The pixel electrode, the common electrode and a piece of liquid crystal form in combination a capacitive pixel. The piece of liquid crystal serves as a dielectric layer of the capacitor. The transparency of the piece of liquid crystal is varied depending upon the intensity of the electric field created in the capacitive pixel as follows.

The thin film transistors are sequentially changed to on-state, and the data lines are electrically connected through the thin film transistors to the associated pixel electrodes. Image-carrying signals are supplied to the data lines in synchronization with the selection of the pixel electrodes, and change the potential level on the pixel electrodes. Electric fields are created between the pixel electrodes and a common electrode, and pieces of liquid crystal over the pixel electrodes are selectively twisted so as to change the transparency of the pixels. Only predetermined polarized light passes the selected pixels. The matrix of pixels partially transfers the back light, and partially interrupts it. As a result, a picture is produced on the matrix of pixels. Thus, the picture is produced on the matrix of pixels through the electrooptic anisotropy.

The matrix of pixels occupies most of the major surface of the substrate structure. However, the peripheral area is not available for the image production. The area assigned to the matrix and the peripheral area are herein-below referred to as "image producing area" and "frame", respectively. The active matrix liquid crystal display unit includes a black matrix and color filters. The black matrix is provided for enhancement of the contrast. The pixels are surrounded by the black matrix, and the black matrix prevents the pixels from leakage light. The color filters are usually provided on the transparent substrate opposite to the transparent substrate for the pixel electrodes and the thin film transistors. A red filter, a green filter and a blue filter are respectively associated with the three pixel electrodes, and colored images are produced on the matrix of pixels with the assistance of the colored filters.

The active matrix liquid crystal display units are categorized into two groups. The first category is featured by the common electrode formed on the transparent substrate opposed to the other transparent substrate where the pixel electrodes and the thin film transistors are formed. An active matrix liquid crystal display unit of the first category is referred to as "twisted nematic type liquid crystal display unit". On the other hand, the other category is featured by the common electrode formed on the transparent substrate together with the pixel electrodes and the thin film transistors. An active matrix liquid crystal display unit of the second category is referred to as "in-plane switching type liquid crystal display unit". The electrooptic anisotropy is used in both twisted nematic and in-plane switching type liquid crystal display units for producing images.

As described hereinbefore, the pixel electrode, the common electrode and the piece of liquid crystal form in combination the capacitive pixel, and the transparency is varied depending upon the intensity of the electric field created in the capacitive pixel. If the liquid crystal layer is changed in resistivity and/or thickness, the capacitance of the pixel is varied, and the picture on the matrix becomes less clear. On the other hand, if the liquid crystal layer is constant in resistivity and thickness over a long time period, the active matrix liquid crystal display unit continuously produces fine images on the matrix of pixels.

The thickness of liquid crystal layer is equal to the gap between the substrate structures. If the gap is constant, the liquid crystal layer does not change the thickness. On the other hand, if the gap is changed, the liquid crystal layer also changes the thickness. For this reason, a spacer is provided between the substrate structure for keeping the gap constant.

The spacer is, by way of example, implemented by micro-pearls scattered in the substrate structure at a predetermined density. Another spacer has a column shape. Photosensitive synthetic resin is spread over the substrate structure, and the photo-sensitive synthetic resin layer is selectively exposed to light. A latent image is produced in the photo-sensitive synthetic resin layer. When the latent image is developed, the column-shaped spacer is left at predetermined positions on the substrate structure. Yet another spacer is produced in the assembling stage of the liquid crystal display unit. Micro-pearls are mixed in sealing agent. The sealing agent is spread over the periphery of the substrate structure and predetermined area. The micro-pearls are spread together with the sealing agent. The other substrate structure is aligned with the substrate structure, and is assembled therewith. The micro-pearls keep the substrate structures spaced from each other for producing the gap.

However, the inner surfaces of the substrate structures are not flat due to the signal lines, electrodes and color filters. In other words, the substrate structures have rolled inner surfaces. If the substrate structures are assembled in such a manner as to oppose the rolled inner surfaces to each other, the gap is varied, and, accordingly, makes the liquid crystal layer varied in thickness. In order to make the inner surface flat, soft coating layers are spread over the rolled inner surfaces of the substrate structures. The signal lines, electrodes and color filters are covered with the soft coating layers, and the inner surfaces of the substrate structures become flat. This results in a constant gap.

FIGS. 1 and 2 shows a typical example of the in-plane switching type liquid crystal display unit. The prior art liquid crystal display unit is broken down into a pair of substrate structures and liquid crystal confined between the lower substrate structure and the upper substrate structure. Thin film transistors are incorporated in the lower substrate structure, and color filters are formed in the upper substrate structure.

The lower substrate structure is fabricated on the basis of a transparent substrate 100. Gate electrodes 3 and a common electrode 4 are formed on the transparent substrate 100, and are covered with an insulating layer 10. Data lines 5, a drain electrode 7, a source electrode 6 and a pixel electrode 2 are patterned on the insulating layer 4, and are converted with a passivation layer 8. The gate electrodes 2 extend in perpendicular to the data lines 6, and thin film transistors are assigned to regions where the gate electrodes 2 cross the data lines 6. Amorphous silicon layers 1 are formed in the regions on the insulating layer 10. The amorphous silicon layer 1 has a drain region, a source region and a channel region, and the drain electrode 7 and the source electrode 6 are held in contact with the drain region and the source region, respectively. The drain electrode 7 is merged with the associated data line 5, and is spaced from the source electrode 6. The source electrode 6 is merged with the pixel electrode 2. The pixel electrode 2 is offset from the common electrode 4, and is in parallel thereto. An orientation layer 11 is formed on the passivation layer 22, and a polarizing plate 18 is attached to the lower surface of the transparent substrate 100. The data lines 5, the drain electrodes 7, the source electrodes 6 and the pixel electrode are shown in black in FIG. 1 for easily discriminating them from other electrodes.

On the other hand, the upper substrate structure has a transparent substrate 200, and a black matrix 12 and colored layers 13 are formed on the lower surface of the transparent substrate 200. Apertures H are defined in the black matrix 12, and are covered with the color filters 13. The black matrix 12 and the colored layers 13 are covered with a flattering layer 15, and an orientation layer 11 is formed on the lower surface of the flattering layer 15. The upper surface of the transparent substrate 200 is covered with a conductive layer 16, and a polarizing plate 17 is attached to the upper surface of the conductive layer 16.

The upper substrate structure is spaced from the lower substrate structure in such a manner that the orientation layers 11 are opposed to each other, and the liquid crystal 20 fills the gap between the orientation layers 11. The orientation layers 18 was subjected to a rubbing at a certain angle with respect to the longitudinal direction of the pixel electrode 2, and the liquid crystal 20 is oriented in a direction indicated by arrow 19.

A spacer is incorporated in the prior art in-plane switching type liquid crystal display unit. FIG. 3 shows the spacer. The spacer is implemented by micro-rods 23 and micro-pearls 25. The micro-rods 23 are mixed in sealing agent 24, and, accordingly, is provided under the frame. The sealing agent 24 is formed of epoxy resin. On the other hand, the micro-pearls 25 are assigned the image producing area.

The micro-pearls 25 are formed of glass, and have a spherical shape. Prior to the assemblage, the micro-pearls 25 are scattered over the orientation layer 11 of one of the substrate structures. The substrate structures are assembled with each other. Then, the micro-pearls 25 are sandwiched between the orientation layers 11 in the image producing area, and keep the substrate structures spaced. The micro-rods 23 are mixed with the sealing agent 24, and is spread in the peripheral area of the substrate structure. When the substrate structures are assembled together, the micro-rods 23 keep the substrate structures spaced. Thus, the micro-pearls 25 cooperate with the micro-rods 23, and the gap is formed between the substrate structures. When the liquid crystal 20 is injected into the gap, the sealing agent 24 prohibits the liquid crystal 20 from flowing out.

FIG. 4 shows another spacer available for the prior art in-plane switching type liquid crystal display unit. In this instance, the spacer is implemented by the micro-rods 23 and spacer columns 26. The micro-rods 23 are mixed in the sealing agent 24, and keeps the peripheral areas of the substrate structures spaced as similar to those shown in FIG. 3. The spacer columns 26 are assigned the image producing area. The spacer columns 26 are formed under the black matrix 12, and are substantially aligned with the data lines 5. The spacer column 26 is formed of acrylic resin, which is used for the flattering layer 15. An acrylic resin layer is patterned into the spacer columns 26 by using photolithographic techniques. The flattering layer 15 and the spacer columns 26 are covered with the orientation layer 11. When the substrate structures are assembled together, the spacer columns 26 are provided between the substrate structures in the image producing area, and keep the substrate structures spaced.

A problem is encountered in the prior art liquid crystal display unit in that irregularity is liable to take place in a picture produced on the image producing area.

SUMMARY OF THE INVENTION

It is therefore an important object of the present invention to provide a liquid crystal display unit, which has a sealing layer effective against contaminant.

It is also an important object of the present invention to provide a process for fabricating the liquid crystal display unit.

The present inventor contemplated the problem inherent in the prior art liquid crystal display unit. The present inventor investigated the contamination, and found that the irregularity was due to contamination of the liquid crystal. The present inventor further investigated the contamination mechanism, and found out that the origin of the contamination.

The liquid crystal was injected into the gap between the substrate structures after the assemblage. The assembled substrate structures tended to be contaminated with excessive liquid crystal, and the manufacturer washed the liquid crystal way with acid solution. Grooves D were formed along the edges of the substrate structure (see FIG. 5), and the acid washing solution was liable to remain in the groove. The sealing agent was in the epoxy resin system. The epoxy resin was liable to be damaged in acid solution. In fact, cracks C took place after the cleaning. As a result, ionic solution, i.e., electrolyte penetrated through the cracks C into the liquid crystal. The ionic solution or contaminant reduced the resistivity of the liquid crystal, and the pixels were varied in capacitance. The potential differences between the pixel electrodes 2 and the common electrode 4 were lost within a short time, and the picture produced on the image producing area fluctuated. Even though the ionic solution could not reach the liquid crystal, the environment contaminated the liquid crystal with humidity in a long operating time.

If the sealing agent was made wider, the cracks C could not reach the liquid crystal layer. However, the wide sealing agent layer resulted in a wide frame, and the wide sealing agent layer was against the request for a narrow frame. Although sealing agent in acrylic resin system withstood the ionic solution, there were only several kinds of acrylic sealing agent presently obtainable in the market, and were not always appropriate to the selected liquid crystal.

To accomplish the object, the present invention proposes to form a spacer of anti-erosion material in a peripheral area. The anti-erosion material is less damaged in the washing solution rather than the sealing agent. The anti-erosion property may be effective against the erosion through ionic reaction. Epoxy resin is, by way of example, used as sealing agent. When residual liquid crystal is washed away by using acid washing solution, acrylic resin is resistive against the acid washing solution, and the spacer may be formed of acrylic resin.

In accordance with one aspect of the present invention, there is provided a liquid crystal display unit for producing visual images in an image producing area comprising a pair of substrate structures providing the visual image producing area and a frame area around the image producing area and including electric components, a sealing layer extending along the frame area for forming an inner space between the substrate structures of the pair and formed of a first kind of material, liquid crystal filling the inner space and varying a transparency depending upon electric signals on the electric components for producing the visual images, and a spacer for spacing the substrate structures from one another and including a spacer wall structure extending in the frame area for encircling the inner space and formed of a second kind of material less eroded rather than the first kind of material in a washing solution used for washing residual liquid crystal from an outer surface of the pair of substrate structures.

In accordance with another aspect of the present invention, there is provided a process for fabricating a liquid crystal display unit comprising the steps of a) preparing a pair of substrate structures having an image producing area and a frame area around the image producing area, at least one of the substrate structures of the pair including a spacer having a spacer wall structure extending along a looped sub-area in the frame area and formed of a kind of material less eroded rather than a sealing agent in a washing solution, b) forming a layer of the sealing agent along the looped sub-area, c) completing the liquid crystal display unit filled with liquid crystal in an inner space between the substrate structures, and d) removing residual liquid crystal form an outer surface of the liquid crystal display unit by using the washing solution.

BRIEF DESCRIPTION OF THE DRAWINGS

The features and advantages of the liquid crystal display unit and the process will be more clearly understood from the following description taken in conjunction with the accompanying drawings in which.

DESCRIPTION OF THE PREFERRED EMBODIMENTS

First Embodiment

Figure 1:
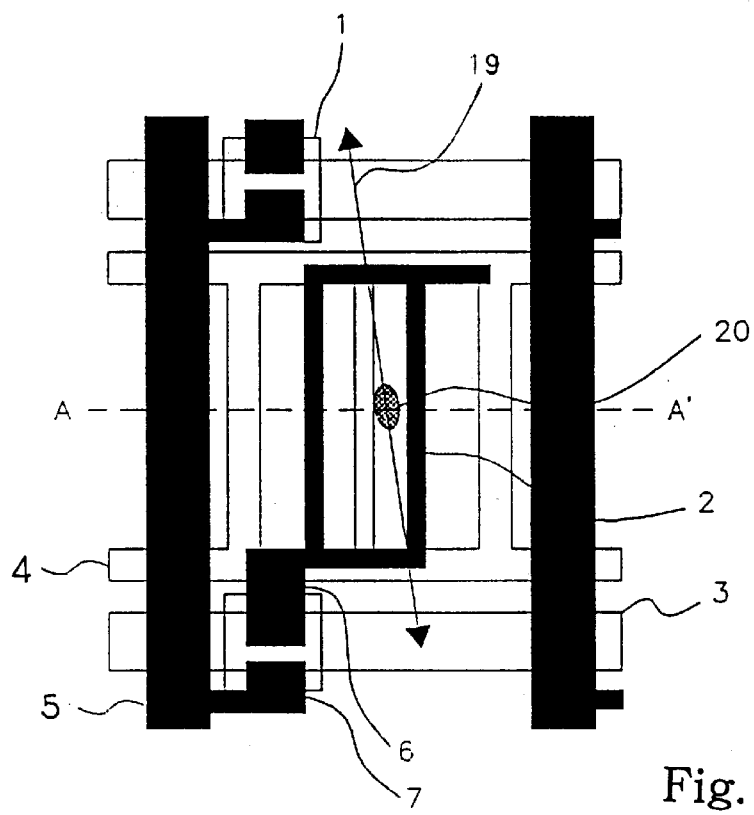
FIG. 1 is a plane view showing the layout of electrodes incorporated in the prior art in-plane switching type liquid crystal display unit.
Figure 2:
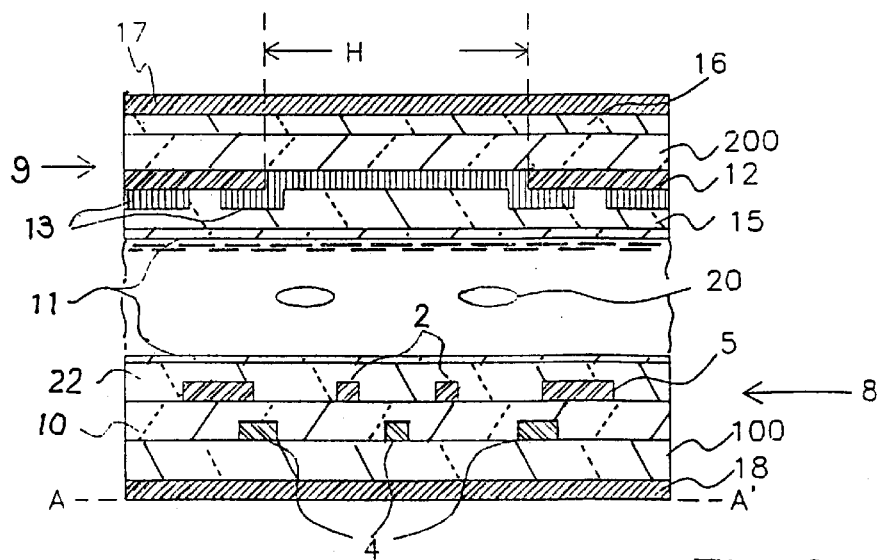
FIG. 2 is a cross sectional view taken along line A–A' of FIG. 1 and showing the structure of the prior art liquid crystal display unit.
Figure 3:
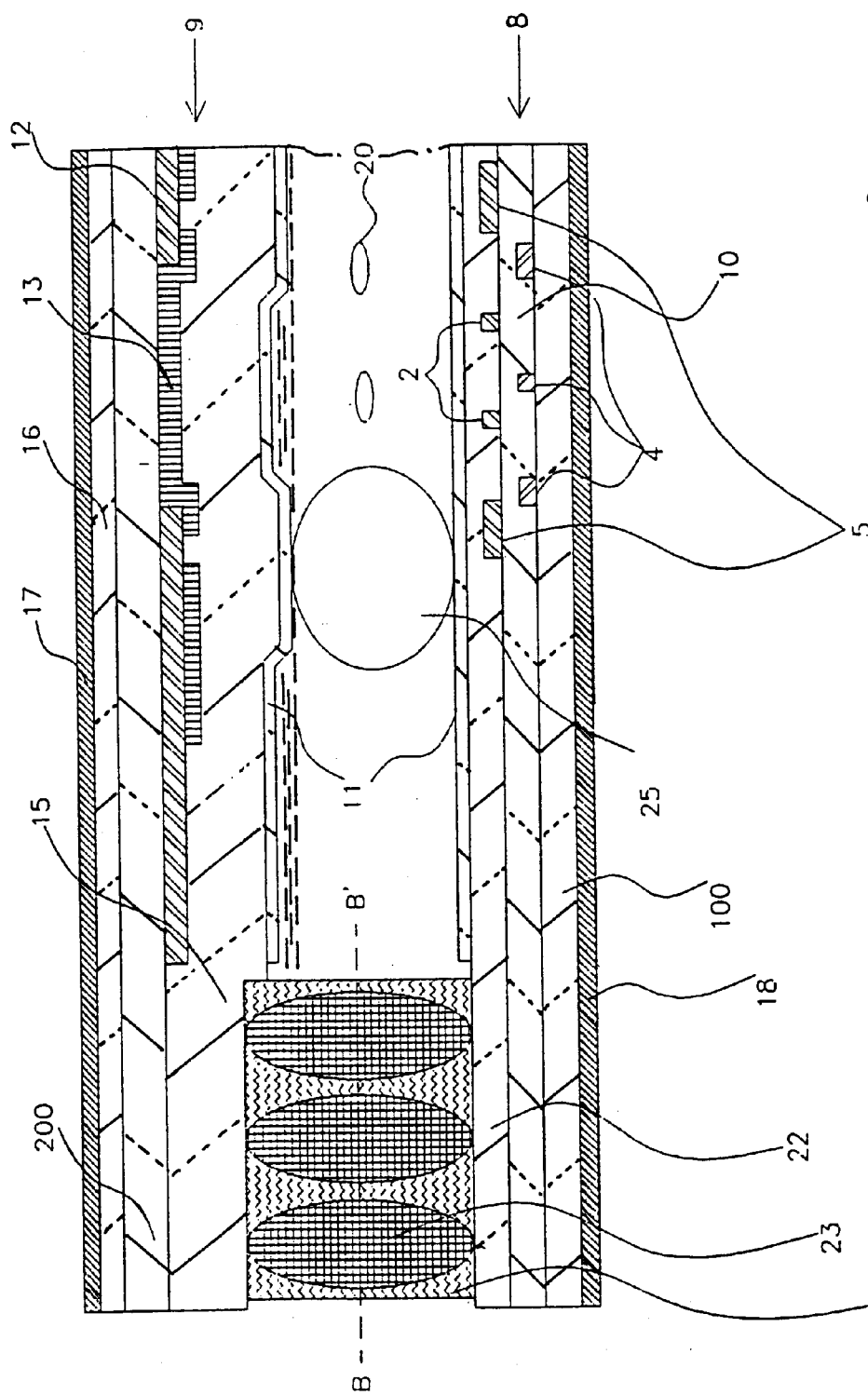
FIG. 3 is a cross sectional view showing the spacer incorporated in the prior art in-plane switching type liquid crystal display unit.
Figure 4:
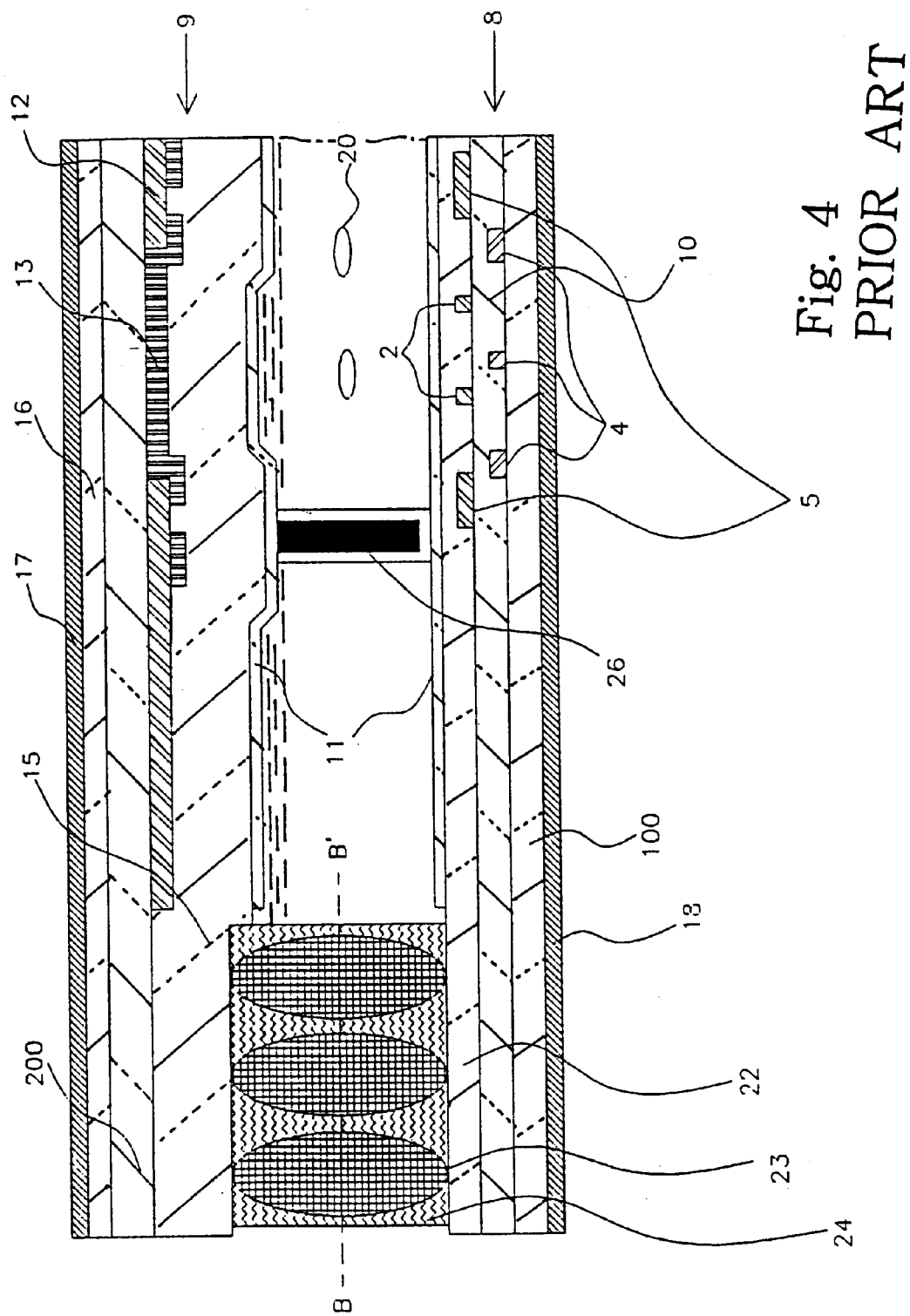
FIG. 4 is a cross sectional view showing another spacer incorporated in the prior art in-plane switching type liquid crystal display unit.
Figure 5:
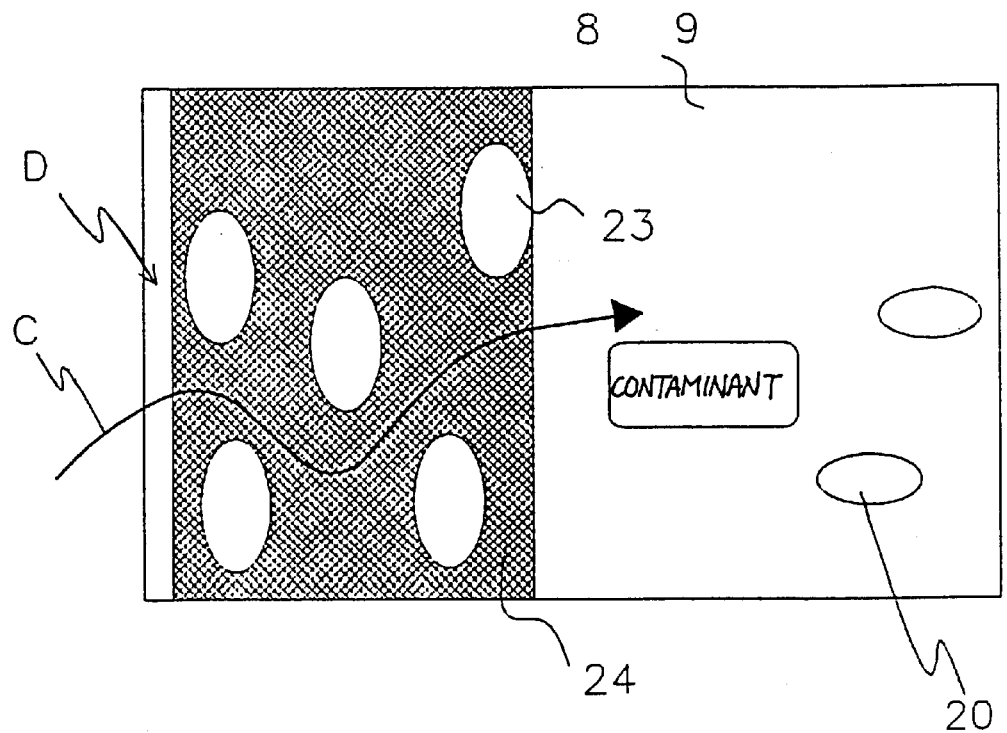
FIG. 5 is a plane view taken along line B–B' of FIGS. 3 and 4 and showing the contaminant penetrating into the liquid crystal.
Figure 6:
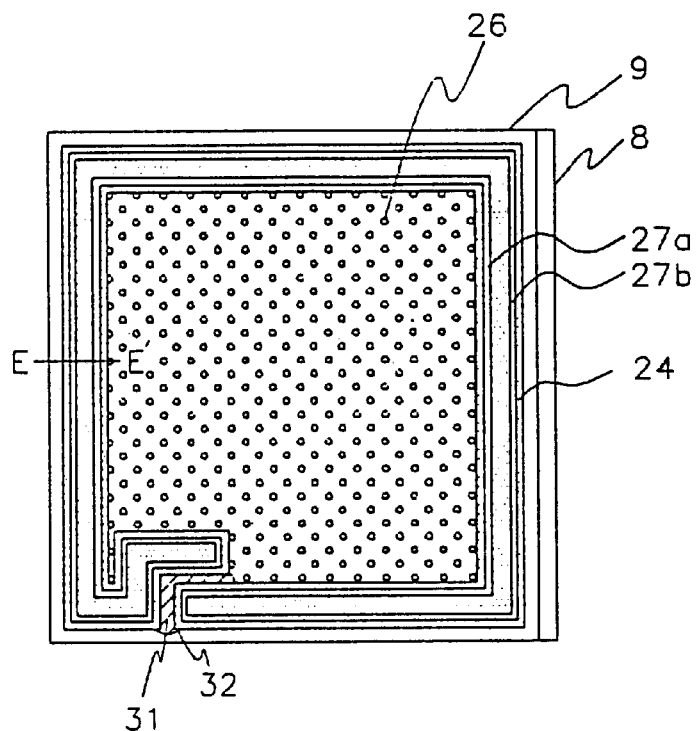
FIG. 6 is a plane view showing a spacer incorporated in an in-plane switching type liquid crystal display unit according to the present invention.
Figure 7:
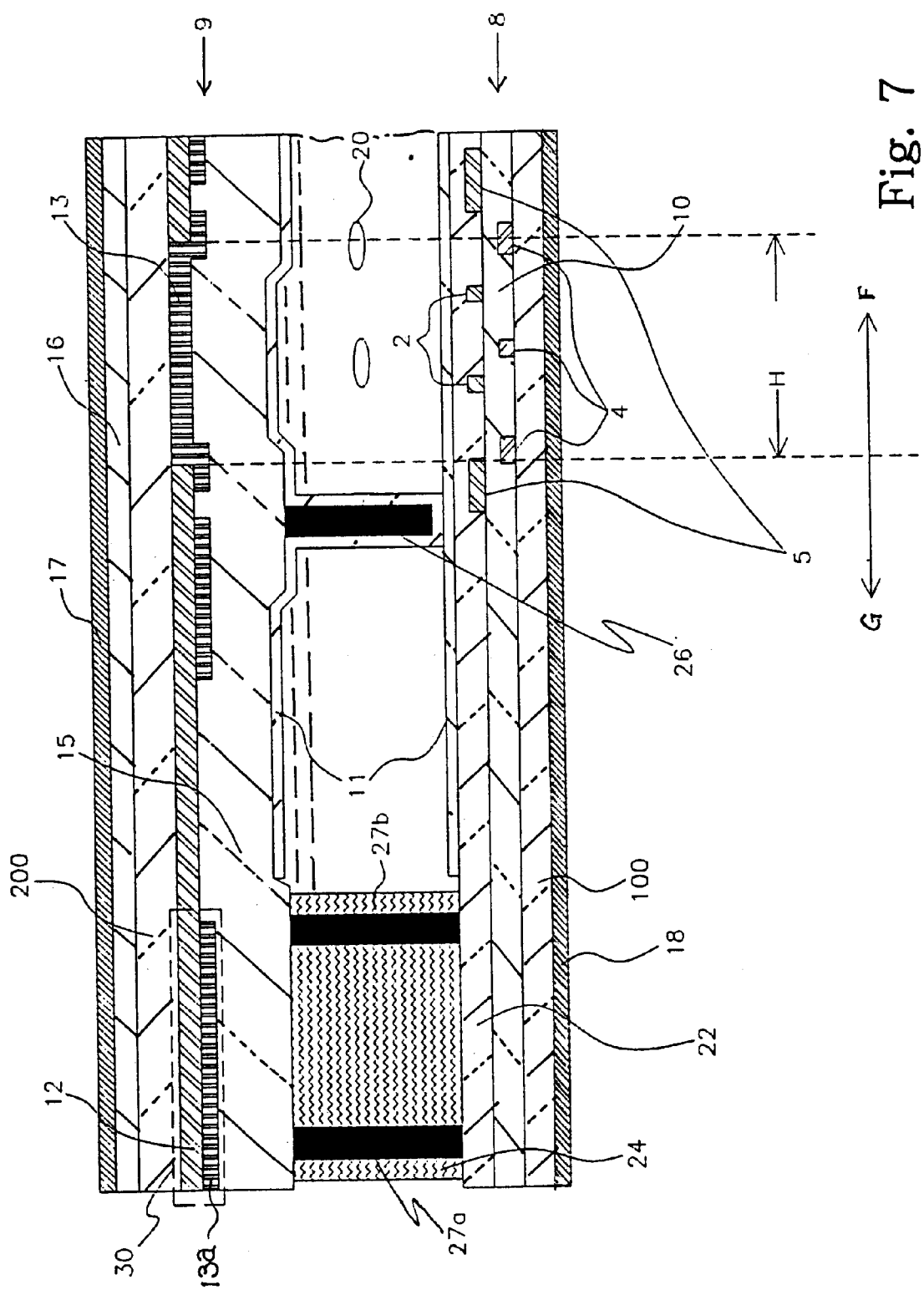
FIG. 7 is a cross sectional view taken along line E–E' of FIG. 6 and showing the structure of the in-plane switching type liquid crystal display unit.

Referring to FIGS. 6 and 7 of the drawings, an in-plane switching type liquid crystal display unit embodying the present invention largely comprises a pair of substrate structures 8/9 and liquid crystal 20. An array of thin film transistors is incorporated in the substrate structure 8 positioned under the liquid crystal 20 in FIG. 7, and color filters 13 are formed in the substrate structure 9 positioned over the liquid crystal 20 in FIG. 7. The substrate structure 8 formed with the thin film transistor array and the substrate structure 9 formed with the color filters are hereinbelow referred to as "array substrate structure" and "counter substrate structure", respectively.

The array substrate structure 8 is fabricated on the basis of a transparent substrate 100. Gate electrodes (not shown) and a common electrode 4 are formed on the transparent substrate 100, and are covered with an insulating layer 10. Data lines 5, drain electrodes (not shown), source electrodes (not shown) and pixel electrodes 2 are patterned on the insulating layer 4, and are converted with a passivation layer 22. The gate electrodes extend in perpendicular to the data lines 6, and thin film transistors are assigned to regions where the gate electrodes 2 cross the data lines 6. Amorphous silicon layers (not shown) are formed in the regions of the insulating layer 10, respectively. Each of the amorphous silicon layers provides a drain region, a source region and a channel region, and the drain electrode and the source electrode are held in contact with the drain region and the source region, respectively. The drain electrode 7 is merged with associated one of the data lines 5, and is spaced from the source electrode. The source electrode is merged with the pixel electrode 2. The amorphous silicon layer, the insulating layer 10, a part of the gate electrode 2 under the amorphous silicon, the drain electrode and the source electrode form in combination each thin film transistor, and each thin film transistor is connected to associated one of the pixel electrode 2.

The pixel electrode 2 is offset from the common electrode 4, and is in parallel thereto. An orientation layer 11 is formed on the passivation layer 22, and a polarizing plate 18 is attached to the lower surface of the transparent substrate 100.

On the other hand, the counter substrate structure 9 has a transparent substrate 200, and a black matrix 12 and color filters 13 are formed on the lower surface of the transparent substrate 200. Apertures H are formed in the black matrix 12, and are covered with the color filters 13, respectively. The aperture H is located over the pixel electrode 2 and the associated portion of the common electrode 4, and, accordingly, the color filter 13 is aligned with the pixel electrode 2 and the associated portion of the common electrode 4. The pixel electrode 2, the associated portion of the common electrode 4 and the color filter 13 serves as a pixel. The color filters 13 are red, green and blue, and the three pixels with the primary three color filters 13 form a dot of a full-color picture on the matrix of pixel groups. The area assigned to the matrix of pixel groups and the area outside thereof are referred to as "image producing area" and "frame area", respectively. The image producing area and the frame area are labeled with "F" and "G", respectively.

The black matrix 12 and the colored layers 13 are covered with a flattering layer 15, and an orientation layer 11 is formed on the lower surface of the flattering layer 15. The orientation layers 11 was subjected to a rubbing at a certain angle with respect to the longitudinal direction of the pixel electrode 2 so as to orient the liquid crystal 20 in the direction. The upper surface of the transparent substrate 200 is covered with a conductive layer 16, and a polarizing plate 17 is attached to the upper surface of the conductive layer 16. The black matrix 12 penetrates into the frame area G, and a colored layer 13a is laminated thereon. The colored layer 13a is patterned from a colored resin layer together with the color filters 13. The black matrix 12 in the frame area G and the colored layer 13a serves as a gap regulating pattern 30. The gap regulating pattern 30 decreases a difference between the gap in the image forming area F and the gap in the outermost periphery of the frame area G. The difference may be decreased to zero.

The in-plane switching type liquid crystal display unit further comprises a spacer 26/27a/27b and a sealing layer 24. The spacer is implemented by a spacer columns 26 and spacer walls 27a/27b. The spacer columns 26 are arranged in the image producing area F and the boundary between the image producing area F and the frame area G as shown in FIG. 6. The spacer columns 26 are formed on the lower surface of the flattering layer 15, and are located over the data lines 5 and under the black matrix 12, i.e., between the data lines 5 and the black matrix 12 (see FIG. 7). In this instance, the spacer columns 26 are formed of photo-sensitive acrylic resin.

On the other hand, the spacer walls 27a/27b are formed in the sealing layer 24, which extends in parallel along the outermost periphery of the frame area G. Although the outer spacer wall 27a is spaced from the inner spacer wall 27b as wide as possible, both of the inner spacer wall 27b and the outer spacer wall 27a are inside the sealing layer 24. In other words, the outer surface of the spacer wall 27a and the inner surface of the spacer wall 27b are covered with the sealing agent. The spacer walls 27a and 27b have end portions which are overlapped with each other. The overlapped portions form an injection port 31. The injection port 31 has a generally L-letter shape, and provides an injection path to the liquid crystal 20. Thus, the injection port 31 is elongated, and the injection path is much longer than the width of the injection port 31. When the array substrate structure 8 is assembled with the counter substrate structure 9, the inner space is connected through the injection port 31 to the outside thereof. The sealing layer 24 is formed of epoxy resin, and the spacer walls 27a/27b are formed of the photo-sensitive acrylic resin as similar to the spacer columns 26.

The counter substrate structure 9 is spaced from the array substrate structure 8 in such a manner that the orientation layers 11 are opposed to each other. The liquid crystal 20 is injected through the injection port 31 into the inner space, and fills the inner space between the orientation layers 11.

After the injection of the liquid crystal 20, the injection port 31 is plugged with a piece of sealing agent 32, and the piece of sealing agent is solidified. After the solidification, the inner space is encircled with a closed wall structure 27a/27b/32.

The pieces of sealing agent is exposed to the inner space filled with the liquid crystal 20 as well as the outside of the liquid crystal display unit. In other words, any spacer wall is not formed in the injection path. In this instance, the piece of sealing agent 32 is formed of the epoxy resin used for the sealing layer 24. Although the epoxy resin is liable to be damaged due to the acid washing solution, cracks hardly reach the inner space, because the injection path is much longer than the width of the injection port 31.

The in-plane switching type liquid crystal display unit implementing the first embodiment is fabricated as follows. FIGS. 8A to 8E show a process for fabricating the in-plane switching type liquid crystal display unit according to the present invention.

The process starts with preparation of the substrate structures 8 and 9. The array substrate structure 8 may be fabricated concurrently with the counter substrate structure 9, prior to fabrication of the counter substrate structure 9 or posterior to the fabrication of the counter substrate structure 9. In any case, the transparent substrate 200 is firstly prepared. Photo-shield material such as, for example, aluminum is deposited over a major surface of the transparent substrate 200. Photo resist solution is spread over the entire surface of the layer of the photo-shield material, and is softly baked so as to form a photo resist layer. A pattern image for the apertures H is transferred from a photo mask (not shown) to the photo resist layer, and a latent image is produced in the photo resist layer. The latent image is developed. Then, the photo resist is partially removed. The patterned photo resist layer is post baked so as to form a photo resist etching mask on the layer of the photo shield material. Thus, the photo resist etching mask is formed on the layer of the photo-shield material by using the photo-lithographic techniques. Using the photo resist etching mask, the layer of the photo-shield material is partially etched away. Then, the layer of the photo-shield material is patterned into the black matrix 12. The black matrix 12 is partially located in the image forming area F and partially located in the frame area G for the gap regulating pattern 30. The apertures H are formed in the black matrix 12 in the image forming area F.

Figure 8A:
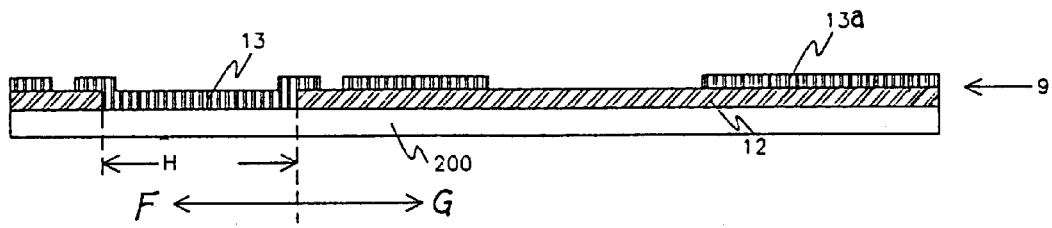
FIGS. 8A to 8F are schematic views showing a process for fabricating the in-plane switching type liquid crystal display unit according to the present invention.

Subsequently, three kinds of colored synthetic resin are sequentially spread over the black matrix 12 and patterned into the color filters 13 and the colored layer 13a. Namely, a red synthetic resin layer, a green synthetic resin layer and a blue synthetic resin layer are formed, and each of the synthetic resin layers is patterned before the formation of the next synthetic resin layer. The apertures H are selectively closed with the red filters 13, green filters and blue filters, and the colored layer 13a is left on the black matrix 12 in the outermost periphery of the frame area G as shown in FIG. 8A.

Figure 8B:
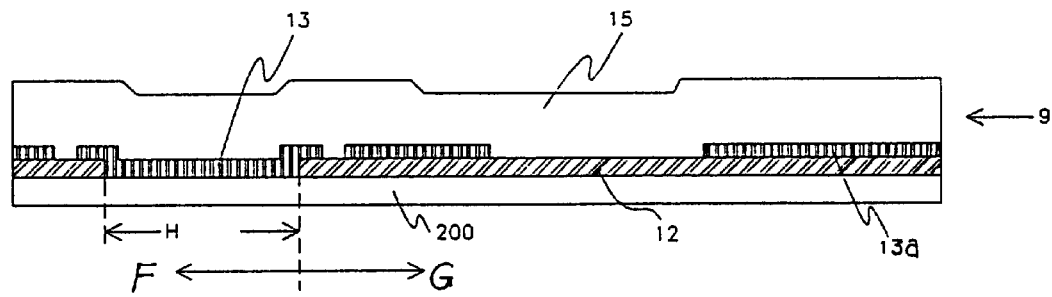

Subsequently, solution of synthetic resin is, by way of example, spun onto the resultant structure. The synthetic resin is solidified through a heat treatment. Then, the black matrix 12, the color filters 13 and the colored layer 13a are covered with the flattering layer 15 as shown in FIG. 8B.

Subsequently, solution of photo-sensitive acrylic resin is spun onto the flattering layer 15, and forms a photo-sensitive acrylic resin layer 28. A positive photo-sensitive acrylic resin and a negative photo-sensitive acrylic resin are available for the present invention. In this instance, the positive photo-sensitive acrylic resin is assumed to be used.

Figure 8C:
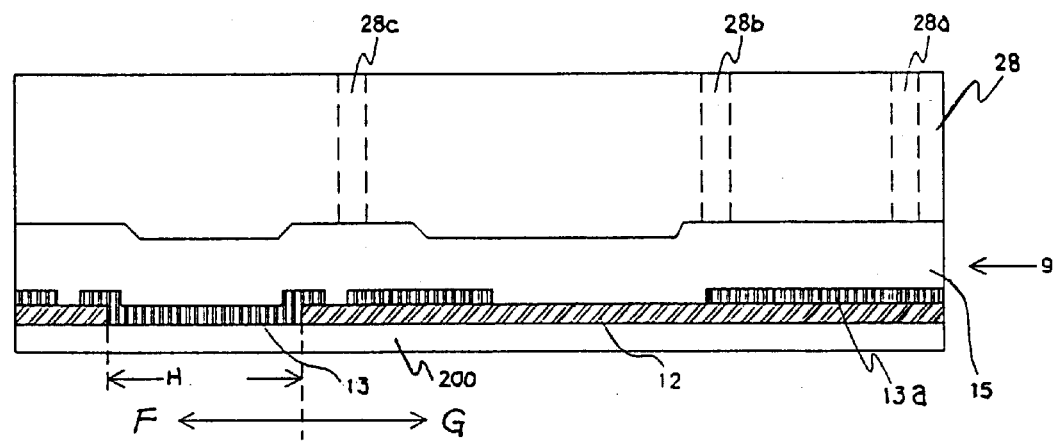

The positive photo-sensitive acrylic resin layer 28 is exposed to image carrying light. The image carrying light is, by way of example, produced through a photo mask. The image carrying light is fallen onto the positive photo-sensitive acrylic resin layer 28, and a latent image 28a, 28b and 28c are produced in the positive photo-sensitive acrylic resin layer 28 as shown in FIG. 8C. The parts of the latent image 28a/28b are corresponding to the outer spacer wall 27a and the inner spacer wall 27b, respectively, and are looped along the outermost periphery of the frame area F. On the other hand, the parts of the latent image 28c are corresponding to the spacer columns 26, and are uniformly located in the image forming area F and the boundary between the image forming area F and the frame area G.

Figure 8D:
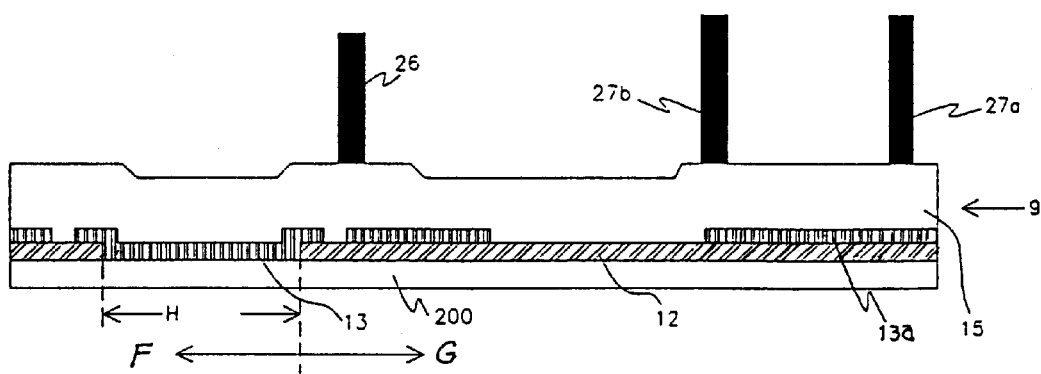

The latent image is developed. Then, the positive photo-sensitive acrylic resin layer 28 is patterned into the spacer columns 26, the inner spacer wall 27b and the outer spacer wall 27a as shown in FIG. 8D. The spacer columns 26 are uniformly arranged in the image forming area F and the boundary area. On the other hand, the outer spacer wall 27a and the inner spacer wall 27b are looped along the outermost periphery, and are partially overlapped with one another for forming the injection port 31. The height of the spacer columns 26 is approximately equal to the height of the spacer walls 27a/27b with respect to the transparent substrate 200, because all of the spacer columns 26 and the spacer walls 27a/27b stand on the lamination of the black matrix 12, the color filter/colored layer 13/13a and the flattering layer 15. Thus, the gap regulating pattern 30 makes the spacer walls 27a/27b equal in height to the spacer columns 26. Moreover, it is not necessary to form a thick photosensitive acrylic resin layer 28, because the gap regulating pattern 30 raises the spacer walls 27a/27b. The spacer walls 27a/27b are not so high that the spacer walls 27a/27b are less liable to be broken.

Subsequently, polyimide is spread over the entire surface of the resultant structure and oriented for the liquid crystal 20 by using a roller pattern transfer. Thus, the grooves are formed in the orientation layer 11 of polyimide. The sealing agent is screen printed or painted along the outermost periphery of the frame area G, and the sealing layer 24 is formed on the frame area G between the inner spacer wall 27b and the outer spacer wall 27a. The sealing layer 24 is higher than the spacer walls 27a/27b. Even if the sealing agent is bulged out from the area between the spacer walls 27a and 27b, the sealing layer is acceptable.

Figure 8E:
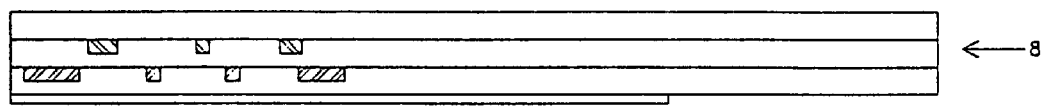
Figure 8E:
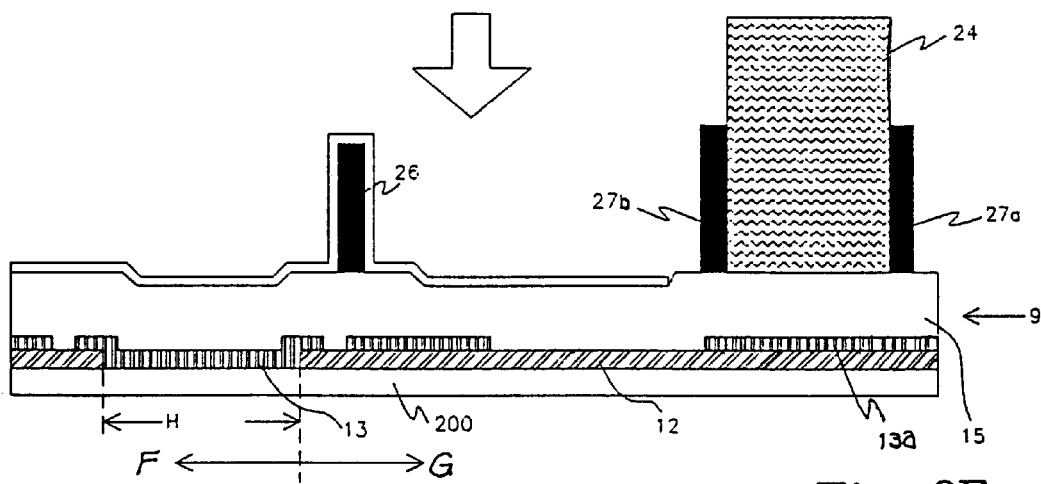
Figure 8F:
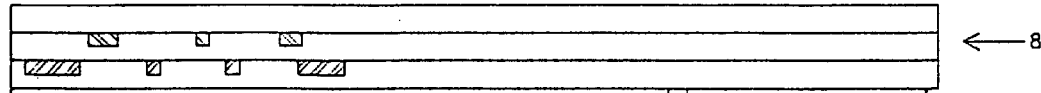
Figure 8F:
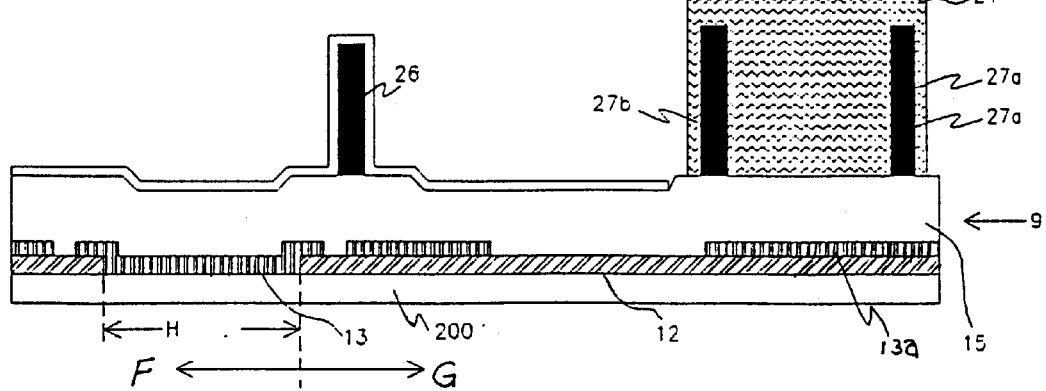

Subsequently, the array substrate structure 8 is aligned with the counter substrate structure 9, and the array substrate structure 8 is advanced toward the counter substrate structure 9 as shown in FIG. 8E. The array substrate structure 8 is firstly brought into contact with the sealing layer 24. While the array substrate structure 8 is approaching toward the counter substrate structure 9, the sealing layer 24 is laterally expanded, and the spacer walls 27a/27b are wrapped in the sealing layer 24 as shown in FIG. 8F.

Subsequently, the gap between the array substrate structure 8 and the counter substrate structure 9 is adjusted to a target value by using a pressure difference between the inner space and the outside thereof. When the gap is adjusted to the target value, the sealing layer 24 is solidified, and the array substrate structure 8 and the counter substrate structure 9 are assembled together.

Subsequently, the liquid crystal 20 is injected into the inner space through the injection port 31, and the injection port 31 is plugged with the piece of sealing agent 32. When the liquid crystal 20 is sealed in the space between the array substrate structure 8 and the counter substrate structure 9, the excess liquid crystal may be adhered to the outer surface. The excess liquid crystal is washed away by using acidic washing solution. The acidic washing solution is liable to erode the sealing layer 24 of epoxy resin. If cracks are formed in the sealing layer 24 due to the acidic washing solution, the spacer walls 27a/27b blocks the liquid crystal 20 from the contaminant, because the spacer walls 27a/27b are formed of anti-eroded material against the acidic washing solution.

The conductive layer 16 and the polarizing plates 17/18 are attached to the resultant structure so as to complete a liquid crystal display panel.

Finally, a driving circuit (not shown) and a back light source (not shown) are assembled with the light crystal display panel for obtaining the in-plane switching type liquid crystal display unit according to the present invention.

As will be understood from the foregoing description, the spacer walls 27a/27b of the anti-eroded material are formed together with the sealing layer 24 in the frame area G. Even though the sealing layer 24 is formed of material affinitive to the liquid crystal 20 but liable to be damaged by the washing solution, the spacer walls 27a/27b do not permit the cracks to reach the inner space, and the contaminant can not penetrate into the liquid crystal 20. Thus, the spacer walls 27a/27b prevent the liquid crystal 20 from the contaminant, and keep the resistivity of the liquid crystal 20 unchanged. This results in a fine picture produced in the image producing area.

Moreover, the spacer walls 27a/27b do not require any wide sealing layer. The manufacturer forms the sealing layer 24 as narrow as possible. For this reason, the in-plane switching type liquid crystal display unit according to the present invention has the narrow frame area G.

The spacer walls 27a/27b are formed from the photo-sensitive acrylic layer 28 together with the spacer columns 26. The manufacturer requires a new photo mask only. Any additional step is not required for the spacer walls 27a/27b. Thus, the spacer walls 27a/27b according to the present invention do not make the fabrication process complicated.

Second Embodiment

Figure 9:
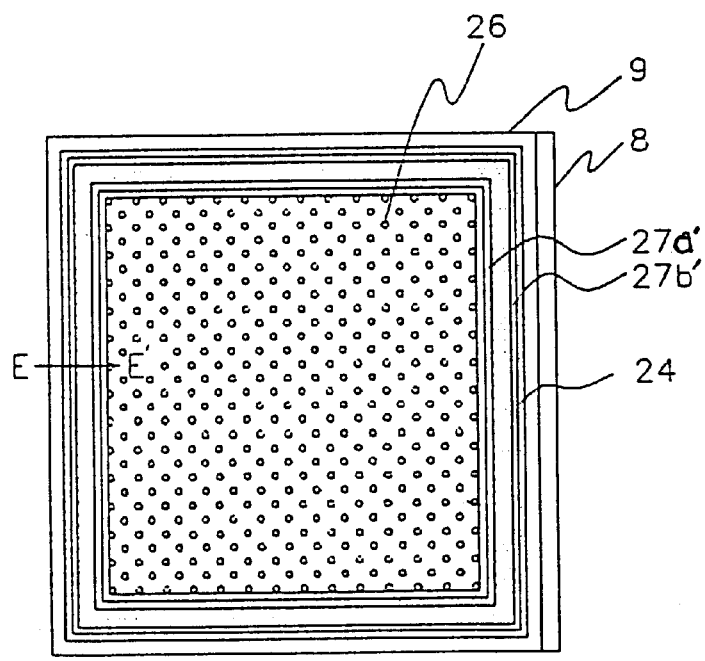
FIG. 9 is a plane view showing a layout of spacers incorporated in another liquid crystal display unit according to the present invention.

Turning to FIG. 9 of the drawings, another in-plane switching type liquid crystal display unit embodying the present invention is formed with spacer walls 27a' and 27b'. The liquid crystal display unit implementing the second embodiment is similar to the first embodiment except the spacer walls 27a' and 27b'. For this reason, the other parts and layers are labeled with the same references designating corresponding parts and layers of the in-plane switching type liquid crystal display unit implementing the first embodiment.

The spacer walls 27a' and 27b' are formed of the acrylic resin, and are located within the sealing layer 24 as similar to the spacer walls 27a/27b. For this reason, the cross section along line E–E' is similar to that shown in FIG. 7. Although the spacer walls 27a/27b form the injection port 31, the spacer walls 27a' and 27b' are perfectly looped in parallel to each other, and any gap does not take place in the spacer walls 27a' and 27b'. The spacer walls 27a' and 27b' perfectly prevent the liquid crystal from the contaminant.

The in-plane switching type liquid crystal display panel implementing the second embodiment is fabricated through a process similar to the process for the first embodiment. The process for the second embodiment is different from the process for the first embodiment in the photo mask used in the step of patterning the photo-sensitive acrylic resin layer and the step of introducing the liquid crystal into the inner space.

The latent images 28a/28b/28c are produced in the photo-sensitive acrylic resin layer differently from the latent image through the photo mask used in the process for the second embodiment. The liquid crystal is dropped onto the image producing area within the spacer walls 27a'/27b', and, thereafter, the array substrate structure 8 is assembled with the counter substrate structure 9. Nevertheless, the spacer walls 27a'/27b' are formed from the photo-sensitive acrylic resin concurrently with the spacer columns 26, and the spacer walls 27a' and 27b' do not make the process complicated.

The spacer walls 27a' and 27b' perfectly prevent the liquid crystal from the contaminant without increase of the sealing layer. Thus, the in-plane switching type liquid crystal display unit implementing the second embodiment achieves all the advantages of the first embodiment.

Third Embodiment

Figure 10:
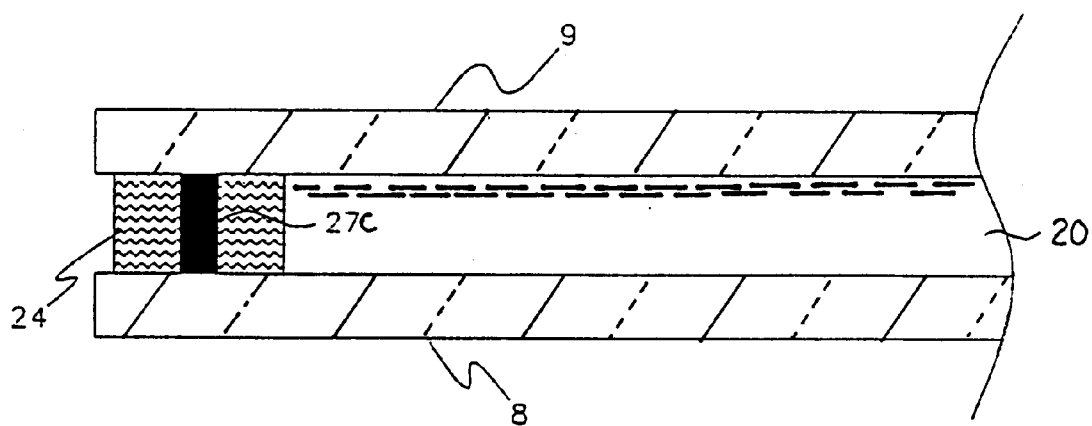
FIG. 10 is a cross sectional view showing the structure of yet another liquid crystal display unit according to the present invention.

FIG. 10 shows yet another liquid crystal display unit embodying the present invention. The liquid crystal display unit implementing the fourth embodiment is formed with a single spacer wall 27C. The liquid crystal display unit implementing the third embodiment is similar to the first embodiment except the single spacer wall 27C. For this reason, the other parts and layers are labeled with the same references designating corresponding parts and layers of the in-plane switching type liquid crystal display unit implementing the first embodiment.

The single spacer wall 27C is formed of the acrylic resin, and are located within the sealing layer 24 as similar to the spacer walls 27a/27b. Both end portions of the single spacer wall 27C are overlapped with each other so as to form an injection port. However, in case where the liquid crystal is dropped onto the space within the single spacer wall 27C, the single spacer wall 27C is looped as similar to the second embodiment.

The single spacer 27C is conducive to the reduction in width of the frame area. However, the single spacer wall 27C can not perfectly prevent the liquid crystal 20 from the contaminant. It is hard to keep the gap between the array substrate structure 8 and the counter substrate structure 9 as stable as the pair of spacer walls 27a/27b. The liquid crystal display unit implementing the third embodiment is fabricated through a process, which is only different from the process for the first embodiment or the process for the second embodiment only in the photo mask for producing latent image in the photosensitive acrylic resin layer.

Fourth Embodiment

Figure 11:
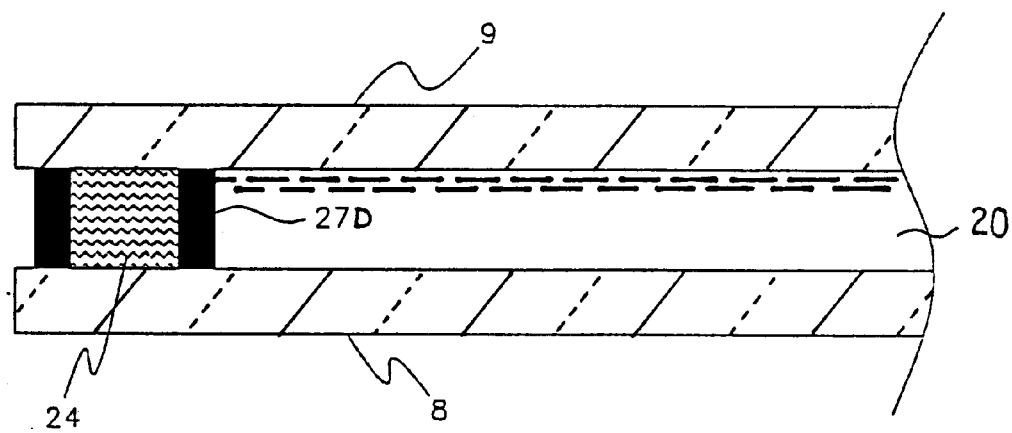
FIG. 11 is a cross sectional view showing the structure of still another liquid crystal display unit according to the present invention.

FIG. 11 shows still another liquid crystal display unit embodying the present invention. The liquid crystal display unit implementing the fourth embodiment is formed with a pair of spacer walls 27D. The liquid crystal display unit implementing the fourth embodiment is similar to the first embodiment except the sealing layer. For this reason, the other parts and layers are labeled with the same references designating corresponding parts and layers of the in-plane switching type liquid crystal display unit implementing the first embodiment.

The pair of spacer walls 27D is formed of the acrylic resin. The spacer walls 27D extend in parallel to each other, and the sealing layer 24 fills the gap between the spacer walls 27D. In other words, only the inner surfaces of the spacer walls 27D are held in contact with the sealing layer 24. Both end portions of the spacer walls 27D are overlapped with each other so as to form an injection port. However, in case where the liquid crystal is dropped onto the space within the spacer walls 27D, the spacer walls 27D are looped as similar to the second embodiment.

The spacer walls 27D achieve all the advantages of the spacer walls 27a/27b. The spacer walls 27D are spaced from each other as wide as possible. For this reason, the substrate structures 8/9 are supported by the spacer walls 27D more stably than those of the first embodiment are. However, the sealing layer 24 is to be screen printed precisely. The throughput may be lowered. The liquid crystal display unit implementing the fourth embodiment is fabricated through a process, which is only different from the process for the first embodiment or the process for the second embodiment only in the step for forming the sealing layer.

Fifth Embodiment

Figure 12:
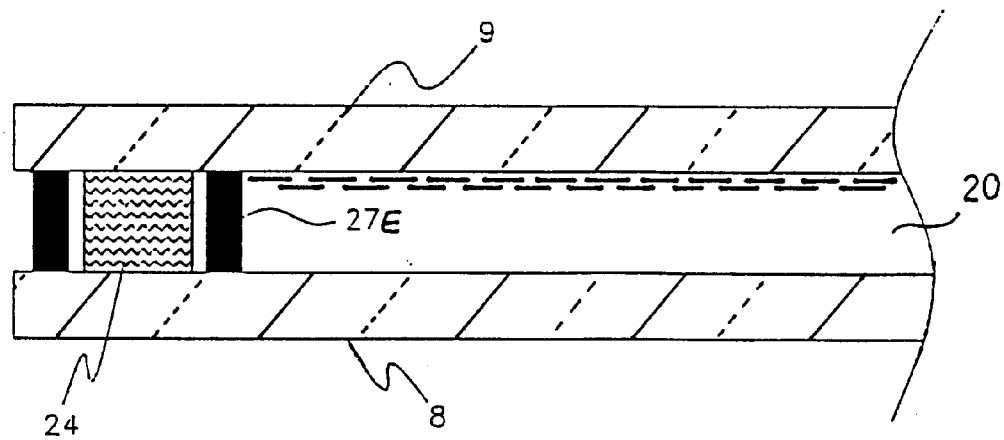
FIG. 12 is a cross sectional view showing the structure of yet another liquid crystal display unit according to the present invention.

FIG. 12 shows yet another liquid crystal display unit embodying the present invention. The liquid crystal display unit implementing the fifth embodiment is formed with a pair of spacer walls 27E. The liquid crystal display unit implementing the fifth embodiment is similar to the first embodiment except the spacer walls 27E. For this reason, the other parts and layers are labeled with the same references designating corresponding parts and layers of the in-plane switching type liquid crystal display unit implementing the first embodiment.

The pair of spacer walls 27E is formed of the acrylic resin. The spacer walls 27E extend in parallel to each other along the periphery of the frame area. However, the gap between the spacer walls 27E is wider than that between the spacer walls 27a and 27b. The sealing layer 24 is as wide as that of the first embodiment. As a result, the inner surfaces of the spacer walls 27E are spaced from the sealing layer 24 as shown. Both end portions of the spacer walls 27E are overlapped with each other so as to form an injection port. However, in case where the liquid crystal is dropped onto the space within the spacer walls 27E, the spacer walls 27E are looped as similar to the second embodiment.

The spacer walls 27D support the substrate structures 8/9 more stably than the spacer walls 27a/27b do. However, the spacer walls 27E make the frame area wider than the frame area of the first embodiment. The liquid crystal display unit implementing the fifth embodiment is fabricated through a process, which is only different from the process for the first embodiment or the process for the second embodiment only in the photo mask for producing the latent image in the photo-sensitive acrylic resin layer.

As will be appreciated from the foregoing description, the sealing layer is formed of a kind of material optimum to the liquid crystal, and the spacer wall or walls are formed of another kind of material less eroded rather than the kind of material. As a result, the spacer wall or walls withstand the washing solution, and do not allow the contaminant to penetrate into the liquid crystal. Thus, the spacer wall or walls according to the present invention enhances the durability of the liquid crystal. As a result, a fine picture is produced in the image producing area after a long operating time.

Since the spacer wall or walls are effective against the contaminant, the manufacturer can narrow the sealing layer. This results in reduction of the frame area.

The spacer wall or walls keep the gap between the substrate structures constant along the periphery, and make the liquid crystal constant in thickness over the image producing area. This results in a fine picture produced on the image producing area.

The spacer wall or walls do not require any additional step. The spacer wall or walls achieves the above-described advantages without complication of the fabrication process.

The gist of the present invention is to form a spacer wall or walls of a kind of material less eroded rather than the sealing agent optimum to the liquid crystal. In the above-described embodiments, the spacer wall or walls and the sealing layer are formed of acrylic resin and epoxy resin, respectively. The acrylic resin and the epoxy resin are an example of the anti-erosion material and the optimum material to the liquid crystal. In other words, the acrylic resin and the epoxy resin do not set a limit on the present invention.

The gap regulating pattern 30 is conducive to the strongly-built liquid crystal display panel, because the spacer wall or walls are surely held in contact with the other substrate structure. The liquid crystal display unit for producing a full color image requires the black matrix and color filters in the image producing area. The black matrix and the color filters are causative of a step between the image producing area and the frame area. The gap regulating pattern eliminates the step from the boundary between the image producing area and the frame area, and causes the spacer wall or walls to be held in contact with the other substrate structure without any regulation in height. In case where the gap regulating pattern is formed from the layers together with the black matrix and the color filters, the fabrication process is not complicated.

Although particular embodiments of the present invention have been shown and described, it will be apparent to those skilled in the art that various changes and modifications may be made without departing from the spirit and scope of the present invention.

The spacer according to the present invention is applicable to another kind of liquid crystal display unit such as, for example, the twisted nematic type liquid crystal display unit.

The spacer wall or walls according to the present invention may be formed in the array substrate structure 8. The spacer wall or walls and the sealing layer may be separately formed in one of the substrate structure and the other substrate structure. For example, the spacer wall or walls are formed in the counter substrate structure, and the sealing layer is formed in the array substrate structure.

The spacer wall or walls may be rounded at the corners. In the above-described embodiments, only one injection port is formed in the spacer wall or walls. More than one port may be formed. In this instance, one of the ports is used for evacuating the air therefrom.

A looped spacer wall or walls may be formed in a liquid crystal display unit, the liquid crystal of which is injected. In this instance, an injection port is not formed in the spacer, but is formed in either substrate structure.

The micro pearls may be used as the spacer in the image producing area. More than two spacer walls may be formed along the periphery of the frame area in so far as the sealing layer strongly adheres the substrate structures.

What is claimed is:

1. A liquid crystal display unit for producing visual images in an image producing area, comprising:
    a pair of substrate structures providing said visual image producing area and a frame area around said image producing area, and including electric components;
    a sealing layer extending along said frame area to define an inner space between the substrate structures of said pair, and formed of a first kind of material;
    liquid crystal filling said inner space, and varying a transparency depending upon electric signals on said electric components for producing said visual images; and
    a spacer for spacing said substrate structures from one another, and including a spacer wall structure extending along said frame area and encompassing at least a portion of the sealing layer, the spacer being formed of a second kind of material that is less eroded than said first kind of material in a washing solution used for washing residual liquid crystal from an outer surface of said pair of substrate structures.

2. The liquid crystal display unit as set forth in claim 1, in which said spacer wall structure is held in contact with said sealing layer.

3. The liquid crystal display unit as set forth in claim 2, in which said spacer wall structure is wrapped in said sealing layer so as to have an outer surface and an inner surface both held in contact with said sealing layer.

4. The liquid crystal display unit as set forth in claim 3, in which said spacer wall structure has plural spacer walls extending in parallel to one another.

5. The liquid crystal display unit as set forth in claim 3, in which said spacer wall structure is implemented by a single spacer wall.

6. The liquid crystal display unit as set forth in claim 2, in which said sealing layer is confined within said spacer wall structure.

7. The liquid crystal display unit as set forth in claim 6, in which said spacer wall structure comprises plural spacer walls extending in parallel.

8. The liquid crystal display unit as set forth in claim 1, in which said spacer wall structure forms at least one port used for injecting said liquid crystal.

9. The liquid crystal display unit as set forth in claim 8, in which said at least one port is plugged with a piece of sealing agent identical with a sealing agent forming said sealing layer.

10. The liquid crystal display unit as set forth in claim 9, in which said spacer wall structure comprises plural spacer walls extending in parallel, and first end portions of said plural spacer walls are overlapped with second end portions of said plural spacer walls for forming said at least one port.

11. The liquid crystal display unit as set forth in claim 10, in which said first portions are bent in such a manner as to form said at least one port like an L-letter shape.

12. The liquid crystal display unit as set forth in claim 1, in which said spacer further includes micro spacers formed in said image producing area for keeping said substrate structures spaced constantly.

13. The liquid crystal display unit as set forth in claim 12, in which said pair of substrate structures has a gap regulating pattern in said frame area so as to make the gap in said image producing area equalized to the gap in said frame area.

14. The liquid crystal display unit as set forth in claim 13, in which one of said substrate structures has a black matrix for defining pixels in said image producing area and color filters respectively contained in said pixels and partially overlapped with said black matrix, and the total thickness of said black matrix and each of said color filters is approximately equal to said gap regulating pattern.

15. The liquid crystal display unit as set forth in claim 1, in which said washing solution is acidic, and said second kind of material is less eroded in the acidic washing solution rather than said first kind of material is.

16. The liquid crystal display unit as set forth in claim 15, in which said first kind of material and said second kind of material are epoxy resin and acrylic resin, respectively.

17. A process for fabricating a liquid crystal display unit, comprising the steps of:
    a) preparing a pair of: substrate structures having an image producing area and a frame area around said image producing area, at least one of the substrate structures of said pair including a spacer having a spacer wall structure extending along a looped sub-area in said frame area and formed of a material that is less eroded than a sealing agent in a washing solution;

b) forming a layer of said sealing agent along said looped sub-area such that the spacer wall encompasses at least a portion of the sealing layer;

c) completing said liquid crystal display unit filled with liquid crystal in an inner space between said substrate structures; and d) removing residual liquid crystal from an outer surface of said liquid crystal display unit using said washing solution.

18. The process as set forth in claim 17, in which said step a) includes the sub-steps of a-1) preparing a transparent substrate for said at least one of said substrate structures, a-2) laminating layers on said transparent substrate, a-3) laminating a photo-sensitive layer on said layers, a-4) forming a latent image for said spacer in said photo-sensitive layer, and a-5) developing said latent image for patterning said photo-sensitive layer into said spacer wall structure in said looped sub-area and micro spacers in said image producing area.

19. The process as set forth in claim 18, in which a black matrix in said image producing area, color filters partially overlapped with said black matrix and a gap regulating pattern are incorporated in said layers laminated in said step a-2).

20. The process as set forth in claim 19, in which said gap regulating pattern has a lower layer formed from a photo-shield layer concurrently with said black matrix and an upper layer formed from a colored layer concurrently with selected ones of said color filters.

* * * * *